United States Patent

[11] 3,612,179

| [72] | Inventors | James L. Anderson;<br>Ernest M. Cloughly; Charles L. Smith, all of Arlington, Tex. |
|---|---|---|
| [21] | Appl. No. | 842,700 |
| [22] | Filed | July 17, 1969 |
| [45] | Patented | Oct. 12, 1971 |
| [73] | Assignee | Byron Jackson Inc.<br>Long Beach, Calif. |

[54] METHOD OF STIMULATING WELL PRODUCTION
4 Claims, No Drawings

[52] U.S. Cl. .................................................... 166/281, 166/307
[51] Int. Cl. ............................................... E21b 43/27
[50] Field of Search ............................................. 166/273, 281, 305, 307, 309

[56] References Cited
UNITED STATES PATENTS

| 2,804,145 | 8/1957 | Holbrook | 166/307 X |
|---|---|---|---|
| 3,177,939 | 4/1965 | Holm et al. | 166/273 |
| 3,323,588 | 6/1967 | Rai et al. | 166/273 |
| 3,335,792 | 8/1967 | O'Brien et al. | 166/273 |
| 3,342,261 | 9/1967 | Bond | 166/305 X |
| 3,491,832 | 1/1970 | Raza | 166/269 |

*Primary Examiner*—Stephen J. Novosad
*Attorneys*—Donald W. Banner, William S. McCurry and John W. Butcher ABSTRACT: The method of stimulating the production of wells by injecting a body of acid solution into a portion of the earth's formation traversed by a well bore, the acid solution being displaced into the formation by an aqueous solution of a foaming agent, in situ foaming of the foaming agent being caused by the pumping of gas into the formation to commingle with the foaming agent, and the foam plugs off the more permeable formation to allow injection of acid solution into the less permeable formation to break down the less permeable formation not blocked by the foam.

METHOD OF STIMULATING WELL PRODUCTION

BACKGROUND OF THE INVENTION

In the production of certain oil and/or gas fields, it is the practice to stimulate the production of the field by increasing the permeability of the oil-bearing strata or formation by subjecting the formation to the effect of a treating agent or acid solution such as, for example, an aqueous hydrochloric acid solution, ranging from about 4 percent to 28 percent. Such treatments are particularly effective where the productive formation is limestone or dolomite, the permeability of which may be readily increased by the injection of hydrochloric acid.

In order to more effectively distribute the acid solution over the entire productive zone, various additives or agents have been employed in the acid solution to plug up the more permeable formation and divert the acid to the less permeable formation with a view to acidizing the entire zone. Such treatments have involved the use of formation-plugging agents such as rock salt and napthalene flakes which flow with the acid solution into the formation and plug up the more permeable portions of the formation, diverting the acid solution to the less permeable formation, following which the solid particles are allowed to dissolve in the well fluids, but such treatments are sometimes believed to cause formation damage and require substantial waiting time for the solids to dissolve.

In addition, solid blocking agents may be employed for temporarily sealing the perforations in the well casing, but such operations are not believed particularly effective in wells where the casing is not in good condition or where substantial communication exists between perforations outside the casing.

All of these prior attempts to selectively acidize the formation are directed towards the problem of more effective distribution of the acid solution through the entire productive zone, notwithstanding the tendency of certain more permeable portions of the formation to offer less resistance to flow of the treating acids than other portions of the formation. If the more permeable portions of the formation are not effectively blocked, then the bulk of the treating acid solution simply follows the course of least resistance, and the entire productive zone or interval can not be produced. Under such circumstances, large quantities of the production fluid may be trapped behind relatively impermeable formation and is unable to flow into the fractures or fissures found in the more permeable formation. In such cases, continued acidizing of the well is of no practical utility.

SUMMARY OF THE INVENTION

The present invention provides a novel method of treating formations of greater and less permeability by the in situ production of a blocking foam which will prevent the flow of the treating fluid or acid into the more permeable formation and divert the treating fluid or acid to the less permeable formation.

More particularly, the present invention contemplates an acid treatment of the formation by: (a) first injecting a quantity of acid solution through the well bore and into the potentially productive earth formation; (b) following the acid solution with an aqueous solution of a foaming surfactant to displace the acid solution into the more permeable regions of the formation; (c) pumping gas, such as air, nitrogen or other gas through the well bore and into the formation so as to contact the foaming agent with the gas to cause a commingling of the gas with the foaming agent to produce the foam, which foam is forced by the gas into the permeable formation and blocks the same; and (d) while the more permeable formation remains blocked by the foam, displacing a further body of acid solution into the formation to effectively treat and increase the permeability of the less permeable portion of the formation.

It will be understood that the above steps may be repeated. That is to say, that following the displacement of the second body of treating acid, the second treating acid solution may be followed by the foaming agent and the air or other gas preliminary to a subsequent third acid treatment.

Advantages of the present treatment include the fact that there is no danger of damage to the formation by solid formation blocking agents, and the treatment is insensitive to the condition of the casing or the existence of communication between perforations outside of the casing, or between formation fractures.

In addition, the foam emulsion rapidly breaks down and the compressed gas used in the foaming of the foaming agent, when the well is again placed on production, has a flushing action and assists in the removal of silt and undissolved particles from the formation following the treatment.

Moreover, the treatment is not adversely affected by well temperature conditions, being useful over a range of subsurface temperatures ranging, say, from 70° to 350° F., while the usual solid materials employed in the selective treatment of well formations are not useful over such a wide range of temperatures.

Other objects and advantages of the invention will be hereinafter described or will be apparent to those skilled in the art.

DESCRIPTION OF THE PREFERRED METHOD

The present invention involves the stimulation of earth formations traversed by a well bore in order to stimulate the flow of formation fluids, such as oil or gas, into the well bore and ultimately to the earth's surface. Notoriously, it is of considerable importance in the acid treatment of limestone or dolomite formations, that the acid be distributed over the entire zone so as to increase permeability of the entire oil or other fluids bearing formation, otherwise, a substantial quantity of formation fluids may be trapped in or behind impermeable portions of the formations and may never be made available to the well bore. This fact may prevail notwithstanding the repeated displacement of large quantities of acid solution or other well-treating fluids through the more permeable formation since the acid solution or other treating fluid simply follows the course of least resistance to flow, i.e., the treating fluid flows through the portion of the formation with the greatest permeability and does not treat or break down the less permeable formation.

In order to plug up or block off the more permeable formation, the present invention involves the in situ production of a foam by the commingling of gas under pressure with a foaming agent introduced into the formation to displace the acid solution or other treating fluid into the more permeable formation or into the formation which is most receptive to the treating fluid. The foaming agents contemplated as having utility are any of the foaming agents or surfactants which in an aqueous solution commingle with air or other gas under pressure to form a foam. Such foaming agents are, for examples: octylphenoxy polyethoxy ethanol; a long chain hydrocarbon sulfonate; n-alkyl trimethylammonium chloride; dioctyl ester of sodium sulfosuccinic acid; c-decyl betaine, as well as others, which may be employed in a concentration of from about 0.1 percent to 5.0 percent by volume of water. While air may be used as a gas with which to produce foam while commingling with the agent, a gas such as nitrogen is preferable to avoid the hazard of fire.

In practicing the present invention, a portion or body of an acid solution or treating fluid is injected into the formation, just as in the case of the conventional acidizing treatment or other fluid injection treatment of the formation, this body of acid or treating fluid is then followed with the aqueous solution of a foaming agent, the latter being displaced into the formation by the compressed gas. Portions of the foaming agent adhere to the formation, within the matrix of the formation and in fractures or fissures therein. This residual foaming agent forms a foam as it is agitated by and caused to commingle with the following gas flow. As the foam is generated, its resistance to movement through the formation matrix and fractures increases, and such increase will result in an increase in the pressure of the gas in the well bore. When a pressure increase in the well bore indicates that the permeability of the formation has been substantially reduced, then a further body of the acid solution or other treating fluid is displaced into the formation to treat the formation which is not blocked off by the foaming agent. These operations may be repeated, if necessary, until it is concluded that the entire formation has been effectively acidized.

Typical examples of the treatment of wells, employing the present method, are as follows:

Example well 1:

This well was producing 60 barrels of oil and 65 barrels of water per day.

Stimulation of the well was effected with 28 percent hydrochloric acid displaced in five stages of 2,000 gallons per stage. After each of the first four stages of 2,000 gallons of acid, 400 gallons of an aqueous foaming agent solution were displaced into the well and into the formation by following the foaming agent with 18,000 standard cubic feet of nitrogen gas.

After the injection of the gas to displace the first stage of foaming solution into the formation, the back pressure was recorded at 1,720 pounds per square inch; after the second stage, the gas pressure was 1,950 pounds per square inch; after the third stage, the gas pressure was 2,050 pounds per square inch; and after the fourth stage, the gas pressure was 2,250 pounds per square inch.

The final 2,000 gallons of acid was commingled and displaced along with a further quantity of nitrogen.

Following this treatment, the well produced 125 barrels of oil and 120 gallons of water per day.

Example well 2:

This well was producing 23 barrels of oil and 25 barrels of water per day.

Stimulation of the well was effected with 28 percent hydrochloric acid displaced in five stages of 2,000 gallons per stage. After each of the first four stages of 2,000 gallons of acid, 400 gallons of an aqueous foaming agent solution were displaced into the well and into the formation by following the foaming agent with 18,000 standard cubic feet of nitrogen gas.

After the injection of the gas to displace the first stage of foaming solution into the formation, the back pressure was recorded at 1,200 pounds per square inch; after the second stage, the gas pressure was 1,250 pounds per square inch; after the third stage, the gas pressure was 1,540 pounds per square inch; and after the fourth stage, the gas pressure was 1,880 pounds per square inch.

The final 2,000 gallons of acid was commingled and displaced along with a further quantity of nitrogen.

Following this treatment the well produced 120 barrels of oil and 25 gallons of water per day.

While, in each of the examples cited above, 28 percent hydrochloric acid was used, other acid solutions are well known. In addition, the quantity of acid per stage, as well as the foaming agent solution and the following gas may be varied.

The significant factors are the selection of a foaming agent capable of producing foam when contacted by the pressurized gas in situ in the formation fractures and fissures, so as to effectively block off the more permeable formation, whereby the subsequently injected acid or treating fluid will attack the more permeable formation.

We claim:

1. The method of acidizing a subsurface earth formation of limestone or dolomite traversed by a well bore, comprising: displacing a body of formation acidizing fluid into the well bore, following said fluid with an aqueous solution of a foaming agent to displace said fluid into the formation, supplying gas under pressure to said well bore behind said solution to force said solution into the more permeable portions of said formation, commingling said gas with said solution to produce an in situ foam in the formation blocking the permeability of the more permeable portions of said formation, and, immediately thereafter, displacing a further body of acidizing fluid through the well bore and into the less permeable portions of said formation to increase the permeability of the latter.

2. The method of claim 1, wherein said aqueous solution contains a foaming surfactant in the range of from 0.1 percent to 5.0 percent by volume of water.

3. The method of acidizing a subsurface earth formation of limestone or dolomite traversed by a well bore, comprising: displacing a body of formation acidizing fluid into the well bore, following said fluid with an aqueous solution of a foaming agent to displace said fluid into the formation, supplying gas under pressure to said well bore behind said solution to force said solution into the more permeable portions of said formation, commingling said gas with said solution to produce an in situ foam in the formation blocking the permeability of the more permeable portions of said formation, and displacing a further body of acidizing fluid through the well bore and into the less permeable portions of said formation to increase the permeability of the latter wherein said further body of acidizing fluid is followed by a further quantity of said aqueous solution of a foaming agent to displace said further body of acidizing fluid into the formation, gas under pressure is again supplied to the well bore to force said further quantity of said aqueous solution of a foaming agent into the formation, and still a further body of acidizing fluid is displaced through the well bore into the formation.

4. The method of acidizing a subsurface earth formation of limestone or dolomite traversed by a well bore, comprising: displacing a body of formation acidizing fluid into the well bore, following said fluid with an aqueous solution of a foaming agent to displace said fluid into the formation, supplying gas under pressure to said well bore behind said solution to force said solution into the more permeable portions of said formation, commingling said gas with said solution to produce an in situ foam in the formation blocking the permeability of the more permeable portions of said formation, and displacing a further body of acidizing fluid through the well bore and into the less permeable portions of said formation to increase the permeability of the latter, wherein said further body of acidizing fluid is followed by a further quantity of said aqueous solution of a foaming agent, gas under pressure is again supplied to the well bore to force said further quantity of said aqueous solution of a foaming agent into the formation, and still a further body of acidizing fluid is displaced through the well bore into the formation, said last mentioned body of acidizing fluid being commingled with a quantity of said gas as it is displaced through the well bore.